United States Patent
Thaysen et al.

(10) Patent No.: US 9,175,650 B2
(45) Date of Patent: Nov. 3, 2015

(54) HIGH-PRESSURE FUEL PUMP FOR AN INTERNAL COMBUSTION ENGINE WITH DIRECT INJECTION

(71) Applicants: Andreas Thaysen, Wolfsburg (DE); Sevket Celovic, Wolfsburg (DE)

(72) Inventors: Andreas Thaysen, Wolfsburg (DE); Sevket Celovic, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/872,559

(22) Filed: Apr. 29, 2013

(65) Prior Publication Data

US 2013/0233284 A1   Sep. 12, 2013

Related U.S. Application Data

(63) Continuation of application No. PCT/EP2011/005535, filed on Nov. 3, 2011.

(30) Foreign Application Priority Data

Nov. 5, 2010   (DE) .......................... 10 2010 050 560

(51) Int. Cl.
*F02M 37/04* (2006.01)
*F04B 39/00* (2006.01)
(Continued)

(52) U.S. Cl.
CPC .......... *F02M 37/04* (2013.01); *F02D 19/0615* (2013.01); *F02D 19/0647* (2013.01);
(Continued)

(58) Field of Classification Search
CPC ................. F05B 2211/305; F05B 2211/31582; F02D 41/0025
USPC .......... 123/495; 417/122, 277, 442, 491, 493, 417/504, 512, 516, 524, 531
See application file for complete search history.

(56) References Cited

U.S. PATENT DOCUMENTS 4,732,114 A * 3/1988 Binder et al. ................ 123/25 E
5,669,334 A * 9/1997 Schonfeld et al. .......... 123/25 R
(Continued)

FOREIGN PATENT DOCUMENTS

DE   3233935 A1   3/1984
DE   3523687 C1   7/1986
(Continued)

OTHER PUBLICATIONS

Search Report issued by the German Patent and Trademark Office for German Patent Application No. DE 10 2010 050 560.9, dated Aug. 22, 2011.
(Continued)

*Primary Examiner* — Mahmoud Gimie
*Assistant Examiner* — David Hamaoui
(74) *Attorney, Agent, or Firm* — Manfred Beck, P.A.

(57) ABSTRACT

A high-pressure fuel pump for an internal combustion engine with direct injection of fuel into at least one combustion chamber of the internal combustion engine is provided. The high-pressure fuel pump includes a low-pressure connection for low-pressure fuel, wherein the low-pressure connection supplies low-pressure fuel to the high-pressure fuel pump, a low-pressure fuel supply chamber, a pump element and a high-pressure connection for discharging fuel from the high-pressure fuel pump. The low-pressure connection, the low-pressure fuel supply chamber, the pump element, and the high-pressure connection are provided in succession in a flow direction of the fuel. A medium-pressure fuel connection opens into a medium-pressure fuel supply chamber for supplying medium-pressure fuel to the high-pressure fuel pump. A fuel switching valve selectively connects the low-pressure fuel supply chamber or the medium-pressure fuel supply chamber in a fluid-conducting manner to the pump element.

15 Claims, 5 Drawing Sheets

(51) Int. Cl.
   *F02D 19/06* (2006.01)
   *F02M 43/02* (2006.01)
   *F02M 63/02* (2006.01)
   *F02M 53/04* (2006.01)

(52) U.S. Cl.
   CPC ........ *F02D19/0676* (2013.01); *F02D 19/0684* (2013.01); *F02D 19/0694* (2013.01); *F02M 43/02* (2013.01); *F02M 63/0225* (2013.01); *F02D 19/0689* (2013.01); *F02M 53/043* (2013.01); *Y02T 10/36* (2013.01)

(56) References Cited

U.S. PATENT DOCUMENTS

| | | | | |
|---|---|---|---|---|
| 5,671,717 | A * | 9/1997 | Rembold et al. | 123/495 |
| 6,035,837 | A * | 3/2000 | Cohen et al. | 123/575 |
| 6,257,177 | B1 * | 7/2001 | Lehmann | 123/41.44 |
| 6,739,317 | B2 * | 5/2004 | Kellner et al. | 123/446 |
| 6,792,915 | B2 * | 9/2004 | Rembold et al. | 123/446 |
| 7,107,942 | B2 * | 9/2006 | Weissman et al. | 123/1 A |
| 7,543,558 | B2 * | 6/2009 | Buck | 123/195 R |
| 7,810,309 | B2 * | 10/2010 | Parsons et al. | 60/39.281 |
| 8,006,677 | B2 * | 8/2011 | Williams et al. | 123/575 |
| 8,182,236 | B2 * | 5/2012 | Shaimi | 417/53 |
| 8,196,567 | B2 * | 6/2012 | Pursifull et al. | 123/495 |
| 2004/0237912 | A1 * | 12/2004 | Pawellek et al. | 123/41.44 |
| 2009/0314262 | A1 * | 12/2009 | Sellentin | 123/557 |
| 2011/0168133 | A1 | 7/2011 | Pursifull et al. | |

FOREIGN PATENT DOCUMENTS

| | | |
|---|---|---|
| DE | 10320558 A1 | 11/2004 |
| DE | 102004011414 A1 | 4/2005 |
| DE | 102006034017 A1 | 1/2008 |
| DE | 10 2008 043 930 A1 | 6/2010 |
| WO | 2011059316 A1 | 5/2011 |

OTHER PUBLICATIONS

International Search Report for International Application No. PCT/EP2011/005535, dated Mar. 28, 2012.
International Preliminary Report on Patentability for International Application No. PCT/EP2011/005535 including Written Opinion of the International Searching Authority and translation thereof, dated May 8, 2013.

* cited by examiner

HIGH-PRESSURE FUEL PUMP FOR AN INTERNAL COMBUSTION ENGINE WITH DIRECT INJECTION

CROSS-REFERENCE TO RELATED APPLICATIONS

This application is a continuation, under 35 U.S.C. §120, of copending International Application No. PCT/EP2011/005535, filed Nov. 3, 2011, which designated the United States; this application also claims the priority, under 35 U.S.C. §119, of German Patent Application No. DE 10 2010 050 560.9, filed Nov. 5, 2010; the prior applications are herewith incorporated by reference in their entirety.

BACKGROUND OF THE INVENTION

Field of the Invention

The invention relates to a high-pressure fuel pump for an internal combustion engine with direct injection of fuel into at least one combustion chamber of the internal combustion engine, wherein the high-pressure fuel pump has, in the flow direction of the fuel, in succession the following components, a low-pressure connection for a low-pressure fuel in order to supply low-pressure fuel to the high-pressure fuel pump, a low-pressure fuel supply chamber, a pump element, and a high-pressure connection for discharging fuel from the high-pressure fuel pump.

German Patent Application Publication No. DE 10 2006 034 017 A1 discloses a fuel supply system for multi-fuel internal combustion engines with a two tank solution in which an optimal mixture is set in accordance with the current operating state of the internal combustion engine. A metering device and/or conveying device has at least two pump chambers, which are separated from one another and which deliver fuel of a particular fuel type in each case separately in the respective pump chamber. Downstream of the pressure sides of the two pump chambers, a mixing of the two types of fuel occurs, whose pressure is then increased in the mixed state by a subsequent high-pressure pump and which, distributed over a common rail, is supplied to respective injectors of the internal combustion engine.

German Patent Application Publication No. DE 103 20 558 A1 discloses an injection control of a fuel direct injection system, in particular of a common rail direct injection system, wherein liquefied petroleum gas (LPG) or fuel for Otto cycle engines is selectively injected directly into the combustion chamber of an internal combustion engine. The two types of fuel, the fuel for Otto cycle engines and the LPG, are injected by means of a single, common injection system directly into a combustion chamber in a cylinder head of the internal-combustion engine. Here, it is necessary, especially with LPG, to pressurize the fuel by means of pumps and pressure regulating valves at any point of its path from the tank to the combustion chamber in the cylinder head to an extent such that at any point the fuel is above the vapor pressure curve of its component propane and thus remains liquid. An additional problem is the critical temperature of 96.8° C. of the autogas component propane, which temperature when reached at any point in the engine compartment, be it in the high-pressure pump or in the rail, would result in a shutdown of the engine. In the fuel direct injection system a low-pressure fuel (fuel for Otto cycle engines) is fed to an input of a high pressure pump. A supply line of a medium-pressure fuel (LPG) joins in the same place. A temperature sensor measures the fuel temperature at this place. The measured value is passed on to a control unit, which, when a temperature that is derived from the vapor-pressure curve of propane is exceeded, closes magnetic valves in the supply line of the medium-pressure fuel, shuts off the pumps for the medium-pressure fuel, turns on the low-pressure fuel pumps and opens a magnetic valve in the low-pressure fuel line, so that the operation of the internal combustion engine is switched to the low-pressure fuel.

SUMMARY OF THE INVENTION

It is accordingly an object of the invention to provide a high-pressure fuel pump which overcomes the above-mentioned disadvantages of the heretofore-known high-pressure fuel pumps. Another object of the invention is to provide a fuel system for two fuels stored in separate storage containers with a fuel supply and a fuel switching for direct-injection Otto cycle engines.

With the foregoing and other objects in view there is provided, in accordance with the invention, in an internal combustion engine with at least one combustion chamber and direct injection of fuel into the at least one combustion chamber, a high-pressure fuel pump including:

a low-pressure connection for low-pressure fuel, the low-pressure connection being configured to supply low-pressure fuel to the high-pressure fuel pump;

a low-pressure fuel supply chamber;

a pump element;

a high-pressure connection for discharging fuel from the high-pressure fuel pump;

the low-pressure connection, the low-pressure fuel supply chamber, the pump element, and the high-pressure connection being provided in succession in a fuel flow direction;

a medium-pressure fuel supply chamber;

a medium-pressure fuel connection for supplying medium-pressure fuel to the high-pressure fuel pump, the medium-pressure fuel connection opening into the medium-pressure fuel supply chamber; and a fuel switching valve disposed and configured such that the fuel switching valve selectively connects the low-pressure fuel supply chamber or the medium-pressure fuel supply chamber in a fluid-conducting manner to the pump element.

According to another feature of the invention, a quantity control valve is provided between the pump element and the fuel switching valve.

According to yet another feature of the invention, a pressure-limiting valve connects a high-pressure side of the pump element to a low-pressure side of the pump element between the quantity control valve and the fuel switching valve.

According to a further feature of the invention, the high-pressure connection is configured to be connected in a fluid-conducting manner to a common rail of the internal combustion engine.

According to another feature of the invention, at least one return line for medium-pressure fuel is provided, wherein the at least one return line is connected in a fluid-conducting manner to the medium-pressure fuel supply chamber.

According to another feature of the invention, at least one return line is provided which branches off downstream of the fuel switching valve and upstream of the pump element.

According to another feature of the invention, a hydraulic resistance is provided in the at least one return line, wherein the hydraulic resistance is disposed and configured such that a given pressure prevails for the medium-pressure fuel upstream of the hydraulic resistance.

According to another feature of the invention, a shut-off valve is disposed in the at least one return line.

According to another feature of the invention, the low-pressure connection supplies, as the low-pressure fuel, a fuel which is liquid at a pressure of 400 kPa to 600 kPa.

According to another feature of the invention, the low-pressure connection supplies a fuel for Otto cycle engines, such as gasoline, as the low-pressure fuel.

According to another feature of the invention, the medium-pressure fuel connection supplies, as the medium-pressure fuel, a fuel which is liquid at a pressure of 2 MPa to 3 MPa.

According to another feature of the invention, the medium-pressure fuel connection supplies autogas or liquefied petroleum gas as the medium-pressure fuel.

According to another feature of the invention, the pump element is a piston pump.

With the objects of the invention in view there is also provided, a high-pressure fuel pump including:

a low-pressure connection for supplying low-pressure fuel to the high-pressure fuel pump;

a low-pressure fuel supply chamber;

a pump element;

a high-pressure connection for discharging fuel from the high-pressure fuel pump;

the low-pressure connection, the low-pressure fuel supply chamber, the pump element, and the high-pressure connection being provided in succession in a fuel flow direction;

a medium-pressure fuel supply chamber;

a medium-pressure fuel connection for supplying medium-pressure fuel to the high-pressure fuel pump, the medium-pressure fuel connection opening into the medium-pressure fuel supply chamber; and a fuel switching valve disposed and configured such that the fuel switching valve selectively connects the low-pressure fuel supply chamber or the medium-pressure fuel supply chamber in a fluid-conducting manner to the pump element.

In other words, according to the invention, there is provided a high-pressure fuel pump for an internal combustion engine with direct injection of fuel into at least one combustion chamber of the internal combustion engine, wherein the high-pressure fuel pump includes, in the flow direction of the fuel, in succession the following, a low-pressure connection for a low-pressure fuel for supplying low-pressure fuel to the high-pressure fuel pump, a low-pressure fuel supply chamber, a pump element, and a high-pressure connection for discharging fuel from the high-pressure fuel pump, wherein the high-pressure fuel pump has a medium-pressure fuel supply chamber and a medium-pressure fuel connection, which opens into the medium-pressure fuel supply chamber, for supplying medium-pressure fuel to the high-pressure fuel pump, wherein a fuel switching valve is disposed and configured such that the fuel switching valve selectively connects the low-pressure fuel supply chamber or the medium-pressure fuel supply chamber in a fluid-conducting manner to the pump element.

This configuration has the advantage that a simplified switching (change-over) between a medium-pressure fuel, such as LPG, and a low-pressure fuel, such as gasoline or a fuel for Otto cycle engines, which operate at different pressure levels, is provided. In this case it is ensured that there is only a minimal mixing of the two fuel types after a switching because the fuels are preselected directly in front of the high-pressure pump chamber.

A simple and accurate quantity control of the fuel discharged from the high-pressure fuel connection is achieved in that a quantity control valve is disposed between the pump element and the fuel switching valve.

A check valve at the low-pressure connection can be eliminated by providing a pressure-limiting valve, which connects a high-pressure side of the pump element to a low-pressure side of the pump element between the quantity control valve and the fuel switching valve.

A particularly effective supply of fuel is achieved in that the high-pressure connection is configured for a fluid-conducting connection with a common rail of the internal combustion engine.

For producing a continuous stream of medium-pressure fuel through the high-pressure fuel pump, so that an appropriate cooling effect is obtained, at least one return line for the medium-pressure fuel is provided, which is connected in a fluid-conducting manner to the medium-pressure fuel supply chamber.

A return line that is universally usable for both fuel types is made available in that at least one return line is provided, which branches off downstream of the fuel switching valve and upstream of the pump element.

An undesired evaporation of the medium-pressure fuel due to a pressure drop is prevented in that a hydraulic resistance is disposed in the return line, wherein the hydraulic resistance is disposed and configured such that a predetermined pressure prevails upstream of the resistance for the medium-pressure fuel.

A shut-off valve is disposed in the return line for controlling the internal return flow.

An operation of the high-pressure fuel pump with a conventional, readily available fuel is achieved in that the low-pressure fuel is a fuel which is liquid at a pressure of 400 to 600 kPa (4 to 6 bar), in particular a fuel for Otto cycle engines.

An operation of the high-pressure fuel pump with a particularly cost-efficient fuel is achieved in that the medium-pressure fuel is a fuel which is liquid at a pressure of 2 to 3 MPa (20 to 30 bar), in particular autogas or LPG (Liquefied Petroleum Gas).

A functionally particularly reliable and durable high-pressure fuel pump with high output pressure levels and at the same time allowing a cost-efficient production is achieved by configuring the pump element as a piston pump.

Other features which are considered as characteristic for the invention are set forth in the appended claims.

Although the invention is illustrated and described herein as embodied in a high-pressure fuel pump for an internal combustion engine having a direct injection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
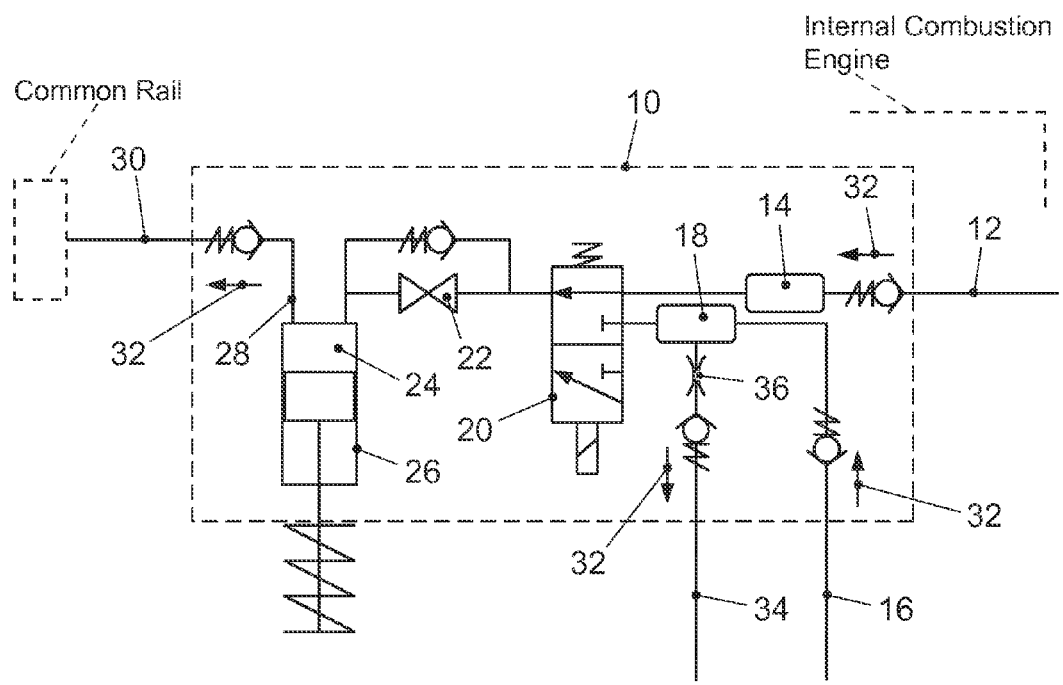
FIG. 1 is a schematic connection diagram of a first preferred embodiment of a high-pressure fuel pump according to the invention.

Referring now to the figures of the drawings in detail and first, particularly, to FIG. 1 thereof, there is shown a first preferred embodiment of a high-pressure fuel pump 10 according to the invention which includes a low-pressure connection 12, which opens into a low-pressure fuel supply chamber 14, and a medium-pressure connection (medium-pressure fuel connection) 16, which opens into a medium-pressure fuel supply chamber 18. Thus a separate feeding of low-pressure fuel and medium-pressure fuel to separate supply chambers 14, 18 takes place in the high-pressure fuel pump 10. A fuel switching valve 20 connects selectively the low-pressure fuel supply chamber 14 or the medium-pressure fuel supply chamber 18 via a quantity control valve 22 to a pump chamber 24 of a pump element 26. The pump element 26 is configured as a piston pump. A high-pressure side 28 of the pump element 26 is connected in a fluid-conducting manner to a high-pressure connection 28 of the high-pressure fuel pump 10. Arrows 32 illustrate a flow direction of the respective fuel. A common rail and the internal combustion engine are schematically indicated by dashed lines in FIG. 1.

A return 34 for medium-pressure fuel branches off from the medium-pressure fuel supply chamber 18. This return 34 has a hydraulic resistance element 36. As a result, a continuous volume flow of the medium-pressure fuel for cooling the high-pressure fuel pump 10 is ensured.

Figure 2:
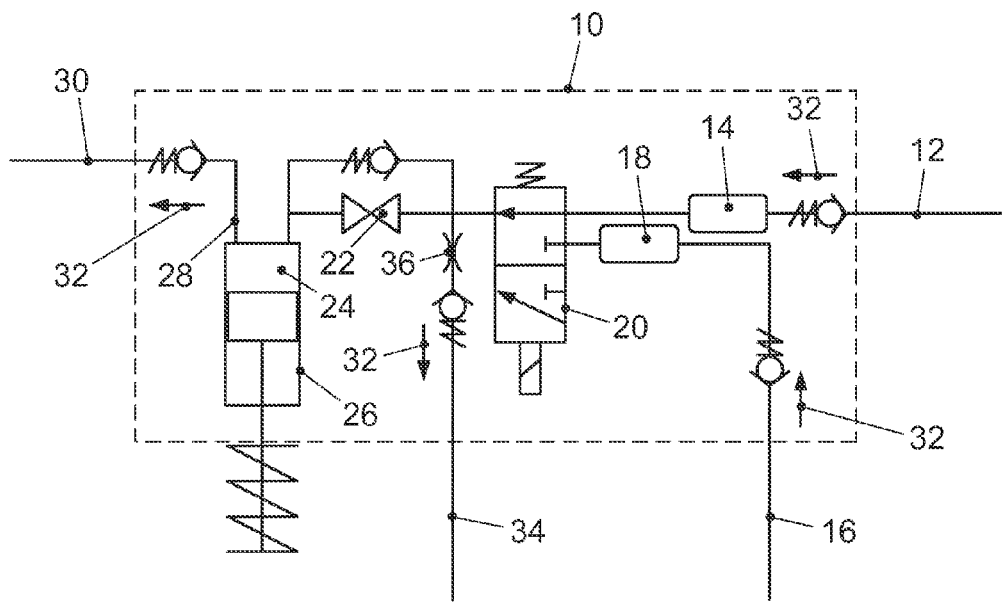
FIG. 2 is a schematic connection diagram of a second preferred embodiment of a high-pressure fuel pump according to the invention.

FIG. 2 shows a second preferred embodiment of a high-pressure fuel pump 10 according to the invention, wherein functionally identical parts are designated by the same reference numerals as in FIG. 1, so that for their explanation reference is made to the above description of FIG. 1. In contrast to the first embodiment according to FIG. 1, the return line 34 does not branch off from the medium-pressure fuel supply chamber 18 but downstream of the fuel switching valve and upstream of the quantity control valve 22. As a result, this return line 34 can selectively be used for both the return flow of medium-pressure fuel as well as for the return flow of low-pressure fuel.

Figure 3:
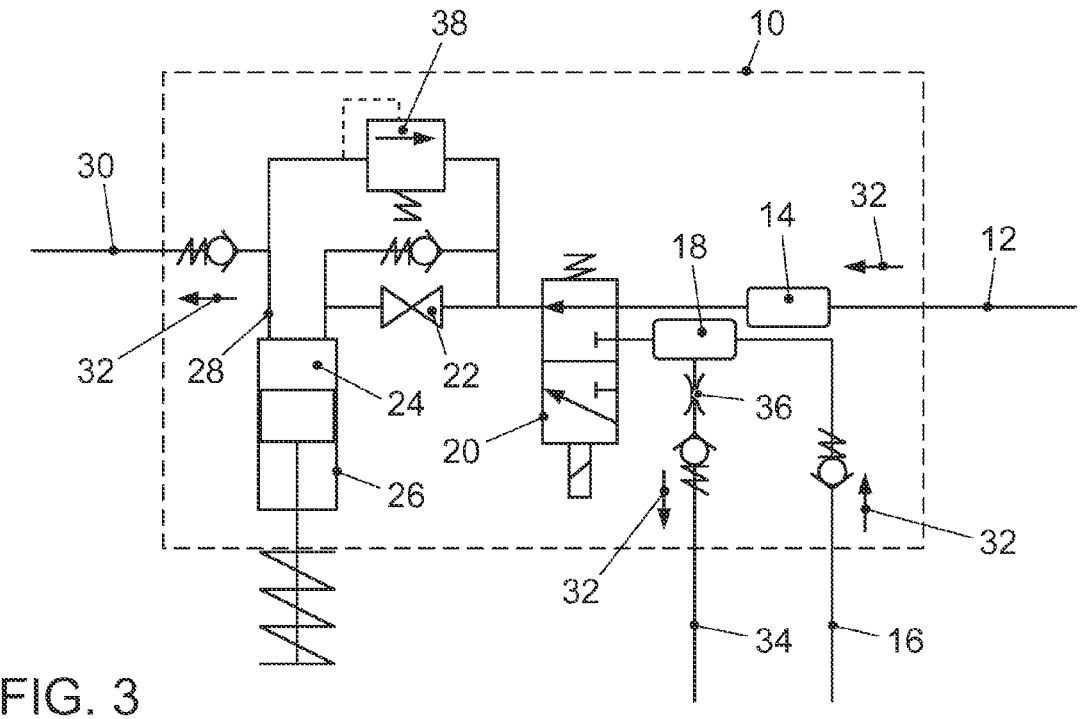
FIG. 3 is a schematic connection diagram of a third preferred embodiment of a high-pressure fuel pump according to the invention.
Figure 4:
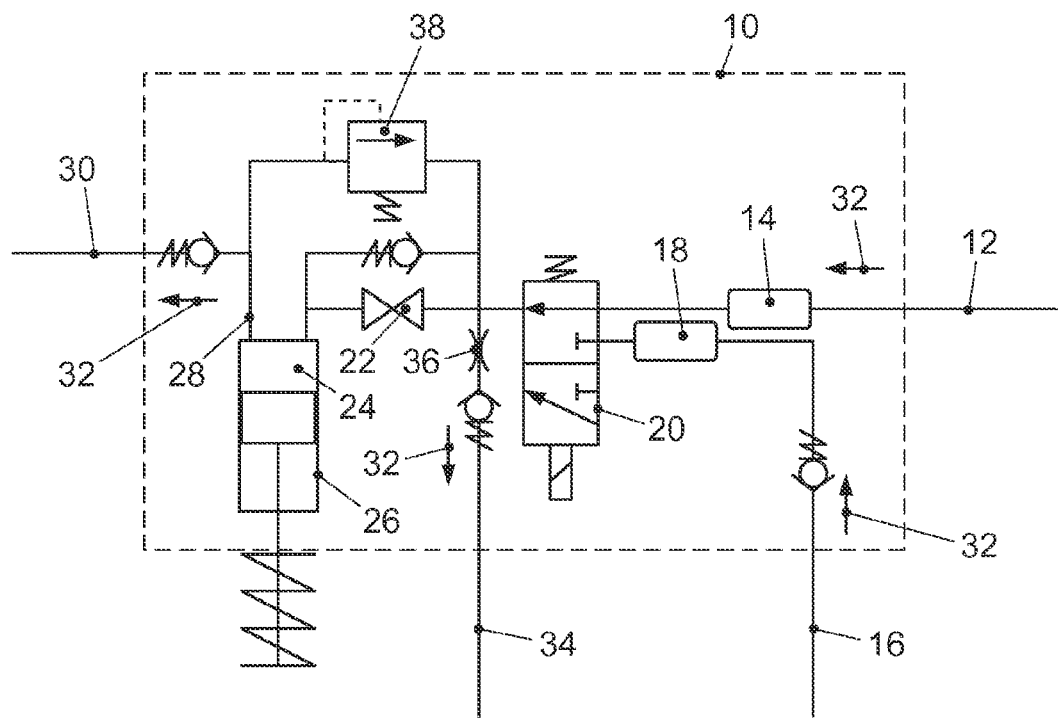
FIG. 4 is a schematic connection diagram of a fourth preferred embodiment of a high-pressure fuel pump according to the invention.

FIG. 3 and, respectively, FIG. 4 show a third and, respectively, fourth preferred embodiment of a high-pressure fuel pump 10 according to the invention, wherein functionally identical parts are designated by the same reference numerals as in FIG. 1 and, respectively, FIG. 2, so that for their explanation reference is made to the above description of FIG. 1 and, respectively, FIG. 2. In contrast to the first embodiment according to FIG. 1 and, respectively, the second embodiment according to FIG. 2, an additional pressure-limiting valve 38 is provided, which connects in a fluid-conducting manner a high-pressure side 28 of the pump element 26 to a low-pressure side of the pump element 26 between the quantity control valve 22 and the fuel switching valve 20. As a result, the check valve in the low-pressure connection 12 is unnecessary, and is accordingly no longer included in FIG. 3 and, respectively, FIG. 4.

Figure 5:
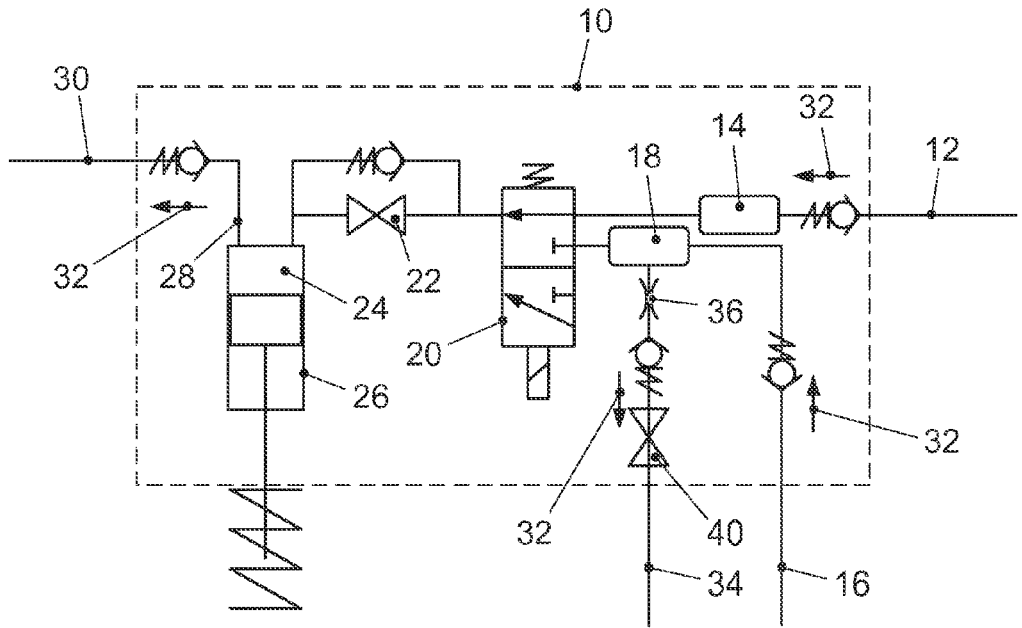
FIG. 5 is a schematic connection diagram of a fifth preferred embodiment of a high-pressure fuel pump according to the invention.
Figure 6:
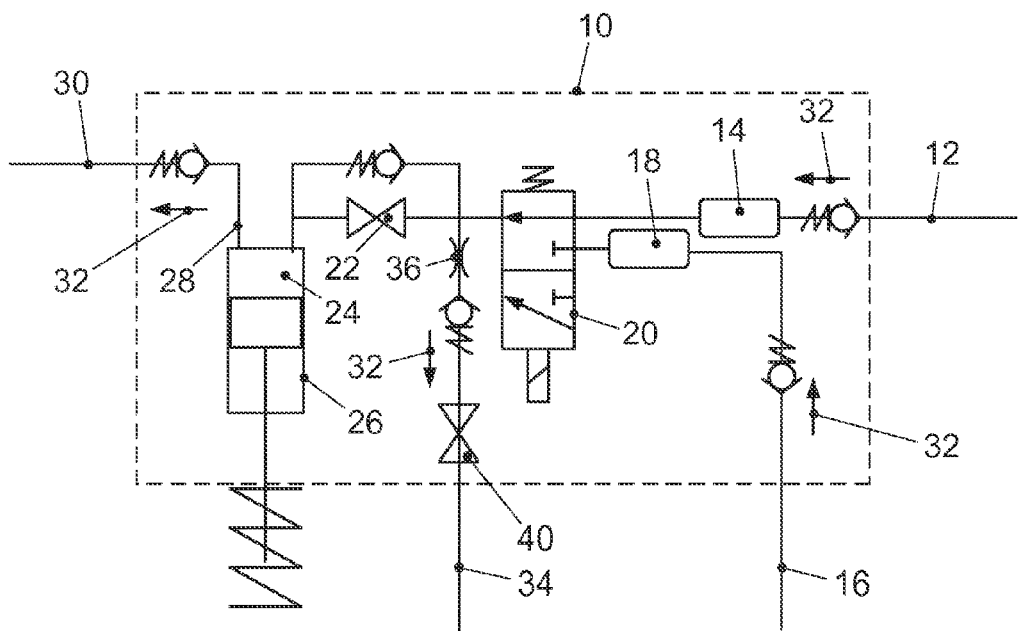
FIG. 6 is a schematic connection diagram of a sixth preferred embodiment of a high-pressure fuel pump according to the invention.

FIG. 5 and, respectively, FIG. 6 show a fifth and, respectively, sixth preferred embodiment of a high-pressure fuel pump 10 according to the invention, wherein functionally identical parts are designated by the same reference numerals as in FIG. 1 and, respectively, FIG. 2, so that for their explanation reference is made to the above description of FIG. 1 and, respectively, FIG. 2. In contrast to the first embodiment according to FIG. 1 and, respectively, to the second embodiment according to FIG. 2, an additional shut-off valve 40 is provided in the return line 34 for medium-pressure fuel. Optionally, this is also combined with the third and, respectively, fourth embodiment according to FIGS. 3 and 4.

In the above-described embodiments according to FIGS. 1, 2, 5, and 6, it can also be provided that the check valve is omitted in the low-pressure connection 12. For all above-described embodiments in accordance with FIGS. 1 to 6 it can additionally or alternatively be provided that the check valve in the medium-pressure connection 16 is omitted.

In a further alternative embodiment, two or more return lines 34 can be provided, which branch off as shown in FIGS. 1 and 2, such that the two embodiments shown in FIGS. 1 and 2 are combined.

The low-pressure fuel is for example gasoline or, respectively, a fuel for Otto-cycle engines at a low pressure of approximately 400 kPa to 600 kPa (4 bar to 6 bar) and the medium-pressure fuel is for example autogas or LPG at a mean pressure of about 2 MPa to 3 MPa (20 bar to 30 bar). In a borderline case, the pressure ranges for the medium-pressure fuel and the low-pressure fuel can overlap, so that it may be the case that both are supplied at the same supply pressure of the high-pressure fuel pump 10 via the connections 12, 16. In other words, there is then an identical supply pressure in the supply chambers 14, 18. The two types of fuel are disposed in separate storage containers and are separately fed, i.e. not mixed, to the high-pressure fuel pump 10.

Via the low-pressure connection 12 and the medium-pressure connection 16, the two types of fuel flow with a supply pressure into the two separate fuel supply chambers 14, 18, which are for example sealed by a cover. The fuel types can in this case have two identical as well as two different pressure levels. The latter is for example the case for the combination of a fuel for Otto cycle engines as a low-pressure fuel and LPG as a medium-pressure fuel. In the first embodiment according to FIG. 1, the medium-pressure fuel supply chamber 18 for LPG has the return 34 with the hydraulic resistance 36 so that in the case of LPG, a continuous volume flow flows independent of the position of the fuel switching valve 20 and independent of the fuel quantity received by the internal combustion engine, wherein the volume flow serves for cooling the high-pressure fuel pump 10 and thus for avoiding undesirable vapor bubbles in the LPG. The hydraulic resistance 36 is configured such that there is always a sufficient pressure in the supply (supply line) or, respectively, in the supply chamber 18 (for example 2 MPa to 3 MPa depending on the tank pressure).

In the second embodiment according to FIG. 2, the pressure in the two supply chambers 14, 18 is maintained as necessary. Both supply chambers 14, 18 have riser bores to the quantity control valve (QCV) 22. The fuel switching valve 20 selectively closes the riser bore of one or the other chamber 14, 18 to the thus QCV (quantity control valve) 22. The thus pre-selected fuel then flows, in dependence on the position of the QCV 22, into the high-pressure pump chamber 24, where it is brought to the desired high-pressure level and then, via the high-pressure connection 30, is fed to a fuel rail of the direct-injection internal combustion engine. It proves to be particularly advantageous for the embodiment of the high-pressure fuel pump 10 according to the invention when the volume between the fuel switching valve 20 and the inlet to the high-pressure pump chamber 24 is very small. As a result, the pressure difference between the fuel types can be reduced when switching from one of the fuel types to the other with a single "pump stroke" of the pump element 26.

The invention provides a direct preselection of the fuel type in the high-pressure fuel pump 10. A switching unit upstream of the high-pressure fuel pump 10 can thus be dispensed with. A minimum possible mixing of both fuel types occurs only in the rail, because the fuels are preselected directly in front of the high-pressure pump chamber 24.

Figure 9:
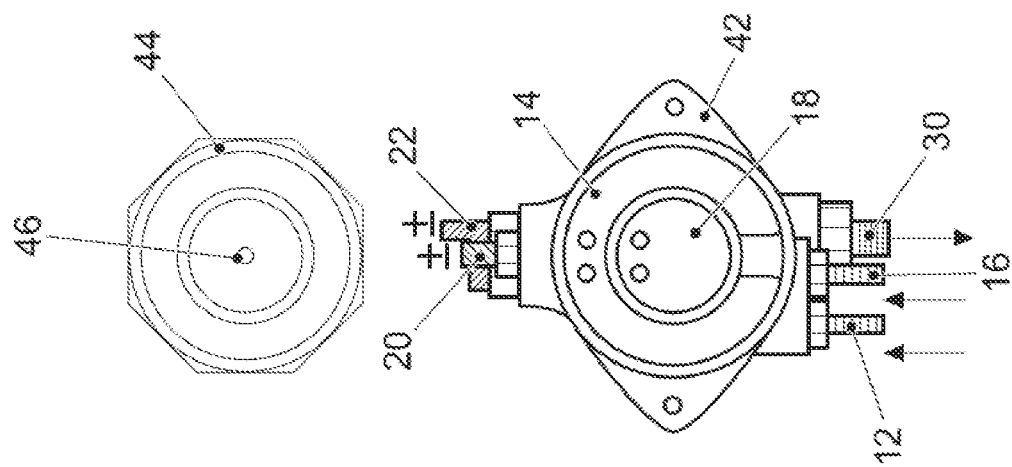
FIG. 9 is a top view of the exemplary mechanical embodiment according to FIG. 7 with the cover removed.
Figure 8:
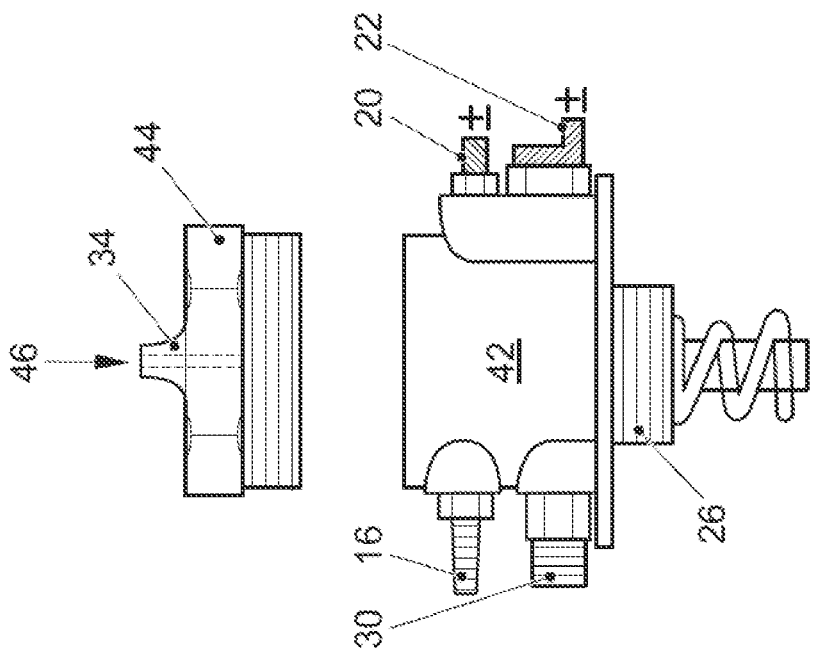
FIG. 8 is a side view of the exemplary mechanical embodiment according to FIG. 7.
Figure 7:
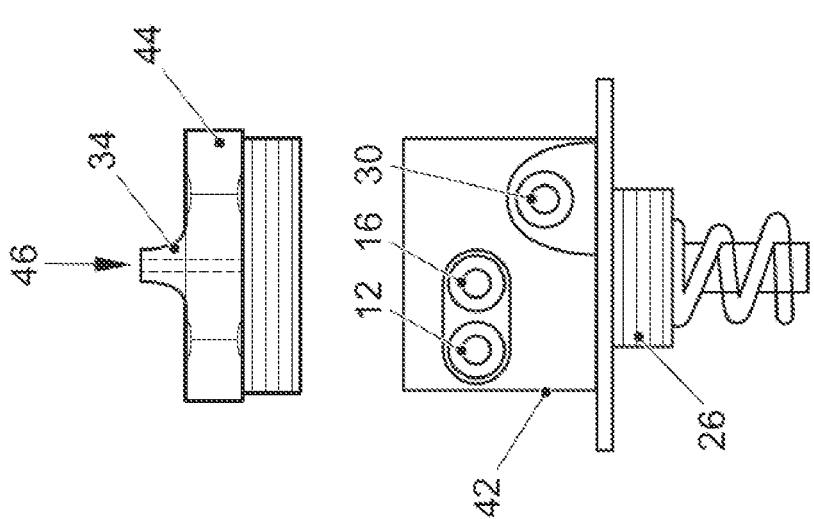
FIG. 7 is a front view of an exemplary mechanical embodiment for the first, third or, respectively, fifth preferred embodiment according to FIGS. 1, 3, and 5 with a return in a supply volume in accordance with the invention.

FIGS. 7 to 9 show an exemplary mechanical embodiment of a high-pressure fuel pump for the first, third and, respectively, fifth preferred embodiment according to FIGS. 1, 3, and 5, wherein the return 34 is disposed at the medium-pressure fuel supply chamber 18 (supply volume 2). Functionally identical parts are designated by the same reference numerals as in FIGS. 1, 3, and 5, so that for their explanation, reference is made to the above description of FIGS. 1, 3, and 5. The mechanical embodiment according to FIGS. 7 to 9 includes a pump housing 42 and a cover 44. As can in particular be seen in FIG. 9, the return 34 is connected in a fluid-conducting manner to the medium-pressure fuel supply chamber 18 (supply volume 2) via a central opening 46 in the cover 44.

Figure 12:
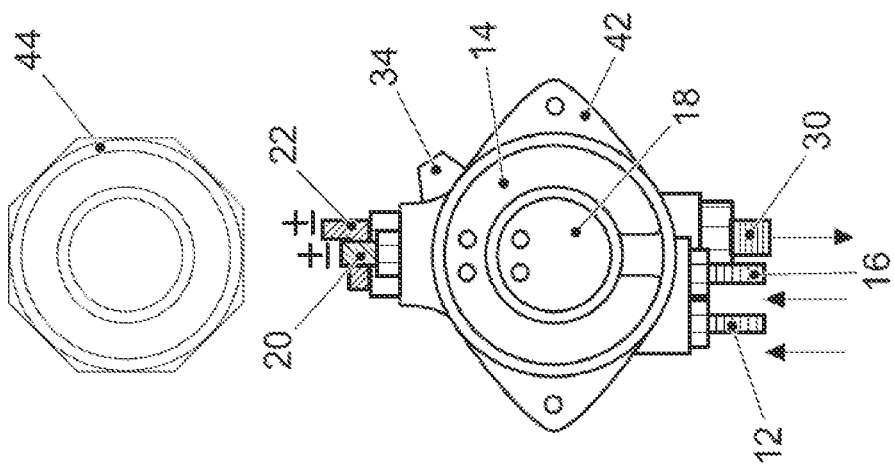
FIG. 12 is a top view of the exemplary mechanical embodiment according to FIG. 10 with the cover removed.
Figure 11:
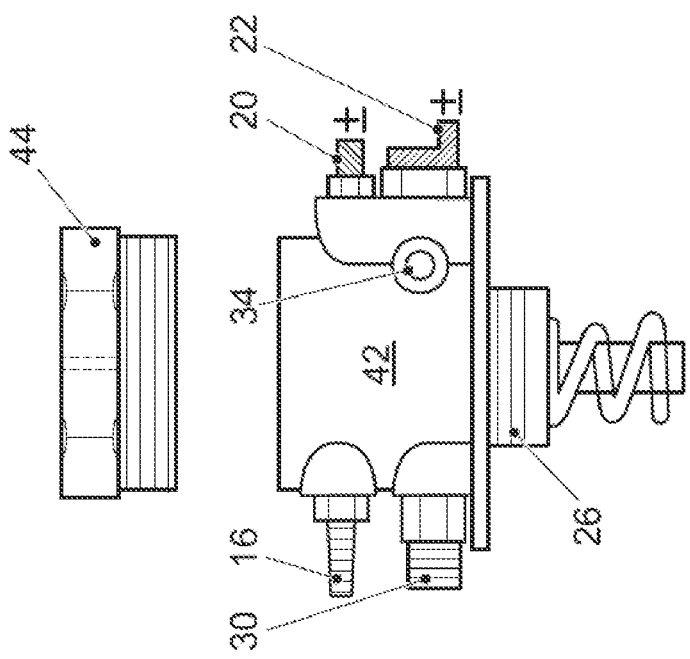
FIG. 11 is a side view of the exemplary mechanical embodiment according to FIG. 10.
Figure 10:
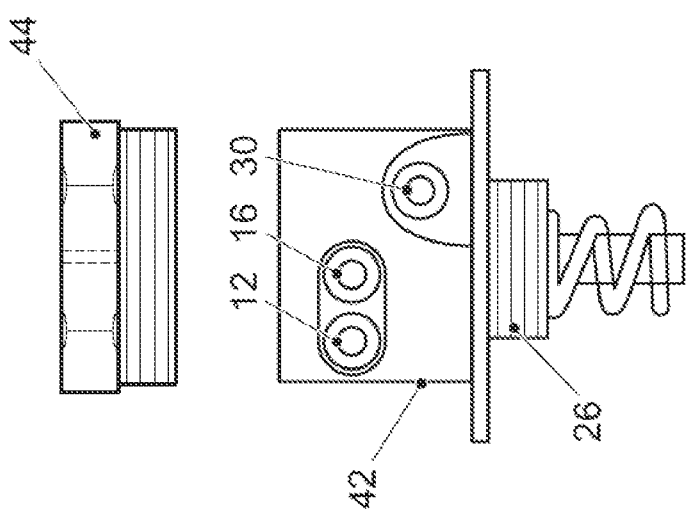
FIG. 10 is a front view of an exemplary mechanical embodiment for the second, fourth or, respectively, sixth preferred embodiment according to FIGS. 2, 4, and 6 with a return before or, respectively, upstream of a quantity control valve.

FIGS. 10 to 12 show an exemplary mechanical embodiment of a high-pressure fuel pump for the second, fourth and, respectively, sixth preferred embodiment according to FIGS. 2, 4, and 6, wherein the return 34 is disposed in front of or, respectively, upstream of the quantity control valve 22. Functionally identical parts are designated by the same reference numerals as in FIGS. 2, 4, and 6, so that for their explanation, reference is made to the above description of FIGS. 2, 4, and 6. The mechanical embodiment according to FIGS. 10 to 12 includes a pump housing 42 and a cover 44.

In the two above-described mechanical embodiments of FIGS. 7 to 12, the separation of the two supply chambers is merely exemplary. A system with two separate supply chambers/damper units connected to a switching valve is also possible.

LIST OF REFERENCE SYMBOLS 10 high-pressure fuel pump
12 low-pressure connection
14 low-pressure fuel supply chamber
16 medium-pressure connection
18 medium-pressure fuel supply chamber
20 fuel switching valve
22 quantity control valve
24 pump chamber
26 pump element
28 high-pressure side
30 high-pressure connection
32 arrows
34 return
36 hydraulic resistance element
38 pressure-limiting valve
40 shut-off valve
42 pump housing
44 cover
46 central opening in the cover 44

The invention claimed is:

1. In an internal combustion engine with at least one combustion chamber and direct injection of fuel into the at least one combustion chamber, a high-pressure fuel pump comprising:
   a low-pressure connection for low-pressure fuel, said low-pressure connection being configured to supply low-pressure fuel to the high-pressure fuel pump;
   a low-pressure fuel supply chamber;
   a pump element;
   a high-pressure connection for discharging fuel from the high-pressure fuel pump;
   a medium-pressure fuel supply chamber;
   a medium-pressure fuel connection for supplying medium-pressure fuel to the high-pressure fuel pump, said medium-pressure fuel connection opening into said medium-pressure fuel supply chamber;
   a fuel switching valve disposed downstream of said low-pressure fuel supply chamber, said fuel switching valve selectively connecting one of said low-pressure fuel supply chamber and said medium-pressure fuel supply chamber in a fluid-conducting manner to said pump element;
   said low-pressure connection, said low-pressure fuel supply chamber, said fuel switching valve, said pump element, and said high-pressure connection being provided in succession in a fuel flow direction;
   a pump housing with a cover;
   said low-pressure fuel supply chamber, said medium-pressure fuel supply chamber, said pump element, and said fuel switching valve being disposed in said pump housing; and
   said low-pressure fuel supply chamber, said medium-pressure fuel supply chamber, said pump element, said fuel switching valve, said low-pressure connection, said high-pressure connection, and said medium-pressure fuel connection together forming a unified device.

2. The high-pressure fuel pump according to claim 1, including a quantity control valve provided between said pump element and said fuel switching valve.

3. The high-pressure fuel pump according to claim 2, including a pressure-limiting valve connecting a high-pressure side of said pump element to a low-pressure side of said pump element between said quantity control valve and said fuel switching valve.

4. The high-pressure fuel pump according to claim 1, wherein said high-pressure connection is configured to be connected in a fluid-conducting manner to a common rail of the internal combustion engine.

5. The high-pressure fuel pump according to claim 1, including at least one return line for medium-pressure fuel, said at least one return line being connected in a fluid-conducting manner to said medium-pressure fuel supply chamber.

6. The high-pressure fuel pump according to claim 1, including at least one return line, said at least one return line branching off downstream of said fuel switching valve and upstream of said pump element.

7. The high-pressure fuel pump according to claim 5, including a hydraulic resistance provided in said at least one return line, said hydraulic resistance being disposed and configured such that a given pressure prevails for the medium-pressure fuel upstream of said hydraulic resistance.

8. The high-pressure fuel pump according to claim 6, including a hydraulic resistance provided in said at least one return line, said hydraulic resistance being disposed and configured such that a given pressure prevails for the medium-pressure fuel upstream of said hydraulic resistance.

9. The high-pressure fuel pump according to claim 5, including a shut-off valve disposed in said at least one return line.

10. The high-pressure fuel pump according to claim 6, including a shut-off valve disposed in said at least one return line.

11. The high-pressure fuel pump according to claim 1, wherein said low-pressure connection supplies, as the low-pressure fuel, a fuel which is liquid at a pressure of 400 kPa to 600 kPa.

12. The high-pressure fuel pump according to claim 1, wherein said low-pressure connection supplies a fuel for Otto cycle engines as the low-pressure fuel.

13. The high-pressure fuel pump according to claim 1, wherein said medium-pressure fuel connection supplies, as the medium-pressure fuel, a fuel which is liquid at a pressure of 2 MPa to 3 MPa.

14. The high-pressure fuel pump according to claim 1, wherein said medium-pressure fuel connection supplies autogas or liquefied petroleum gas as the medium-pressure fuel.

15. The high-pressure fuel pump according to claim 1, wherein said pump element is a piston pump.

* * * * *